United States Patent [19]

Dollhopf et al.

[11] Patent Number: 4,959,186
[45] Date of Patent: Sep. 25, 1990

[54] EXTRUSION PROCESS AND SINGLE-, DUAL- OR MULTIPLE-SCREW EXTRUDER

[75] Inventors: Rüdiger Dollhopf, Herbolzheim; Bernd Nandzik, Gundelfingen, both of Fed. Rep. of Germany

[73] Assignee: Rhodia AG, Freiburg, Fed. Rep. of Germany

[21] Appl. No.: 247,792

[22] Filed: Sep. 22, 1988

[30] Foreign Application Priority Data

May 27, 1988 [DE] Fed. Rep. of Germany ....... 3817941

[51] Int. Cl.$^5$ ............................................. B29C 47/76
[52] U.S. Cl. .............................. 264/102; 264/211.23; 264/349; 366/75; 366/86; 425/173; 425/203; 425/205; 425/215; 425/382.4
[58] Field of Search ................. 264/102, 101, 211.23, 264/349, 37; 425/203–208, 376.1, 382 R, 215, 173, 209, 382.4; 366/75, 86

[56] References Cited

U.S. PATENT DOCUMENTS

| | | | |
|---|---|---|---|
| 3,224,739 | 12/1965 | Schuur | 425/204 |
| 3,253,303 | 5/1966 | Bradt | 264/102 |
| 3,256,562 | 6/1966 | Heard, Jr. | 425/382 R |
| 3,459,840 | 8/1969 | Wood | 264/37 |
| 3,577,588 | 5/1971 | Chisholm | 425/376.1 |
| 3,632,256 | 1/1972 | Kasting et al. | 425/205 |
| 3,963,558 | 6/1976 | Skidmore | 264/102 |
| 4,051,212 | 9/1977 | Grigat et al. | 264/102 |
| 4,103,354 | 7/1978 | Gorbatov et al. | 366/88 |
| 4,110,844 | 8/1978 | Nakamura | 425/203 |
| 4,212,543 | 7/1980 | Bersano | 425/204 |

FOREIGN PATENT DOCUMENTS

| | | | |
|---|---|---|---|
| 146897 | 8/1936 | Austria | 264/102 |
| 0015457 | 2/1980 | European Pat. Off. . | |
| 0114999 | 4/1988 | European Pat. Off. . | |
| 503875 | 12/1954 | Italy | 425/203 |
| 1167850 | 10/1969 | United Kingdom | 425/204 |

*Primary Examiner*—Jeffery Thurlow
*Attorney, Agent, or Firm*—Bucknam and Archer

[57] ABSTRACT

In the case of the extruder, the thread of the screw, or that of the screws, is partly left-handed and partly right-handed, so that one part of the material to be processed is conveyed in direction A, while the other part is conveyed in the opposite direction B. The process is a degasifying-extrusion-process and the extruder is a degasifying extruder. The apparatus includes a reverse-degasifying assembly (7,22) at the end (8,19) of the screw (1,16), or screws (1,16), if the material to be processed is carried away from this end, and/or a reverse-degasifying assembly (41,52) at the location between the threaded sections of the screw (1,16) or screws (1,16), so that the material to be processed is carried away in opposite directions B and A. According to the invention, continuous operation is possible, no dead areas and break-away edges are formed, the reverse-degasifying assembly (7,22,41,52) is easily sealed off against any entry of oxygen, products sensitive to heat and oxidation, such as polyamide-66, may also be produced, without damage, in continuous operation, for example by synthetic-fibre extrusion spinning.

17 Claims, 7 Drawing Sheets

EXTRUSION PROCESS AND SINGLE-, DUAL- OR MULTIPLE-SCREW EXTRUDER

The invention relates to an extrusion process with the aid of a single-, dual- or multiple-screw extruder whereby, since the thread of the screw, or that of the screws, is partly left-handed and partly right-handed, the material to be processed is guided in the longitudinal direction of the screw, or screws, partly in a direction A and partly in a direction B opposite to the direction A.

The invention also relates to a single-, dual- or multiple-screw extruder comprising essentially:
one rotatable screw, two rotatable screws, or more than two rotatable screws,
a housing within which the screw, or screws, can rotate.
a drive,
a transmission,
one or more devices for introducing the material. and
one or more devices for discharging the material,
wherein, for the purpose of guiding the material to be processed, in the longitudinal direction of the screw, or screws, partly in a direction A and partly in a direction B opposite to the direction A, the thread of the screw, or screws, is partly left-handed and partly right-handed, whereby, in the case of two or more screws - as seen in the direction of the transverse axis of these screws.
the left-handed sections face each other and the right-handed sections face each other or
the left-handed sections face the right-handed sections.

In the case of known extrusion processes with single-, dual- or multiple-screw extruders, the material to be processed is conveyed or guided in-only one - axial - direction, namely in the longitudinal direction of the screw, or screws, and away from the drive. The resulting large axial recoil-forces all act in the same direction, namely towards the transmission. In order to absorb these large recoil-forces, and the corresponding pressure, a bearing (an axial bearing) must be provided. Axial bearings of this kind take up a considerable amount of room, especially those which are required to absorb very large recoil-forces. In the case of single-screw extruders, in which simple ball- or roller-thrust-bearings, for example, are used as axial bearings or, for very heavy loads, roller-bearings arranged in tandem are used, the amount of room required for such bearings is not of great significance since, because of the presence of only one screw, space is generally available also for the bearing. However, the cost of a single-screw extruder is, of course, considerably increased if the axial bearing must absorb heavy loads.

In the case of extruders with two or more screws, the design makes matters substantially more complicated, since the presence of two or more screws usually leaves no room for the bearing; for this reason, in the case of dual- or multiple-screw extruders, use is made of highly complex and costly axial bearings, or conical screws and a corresponding housing, in order to increase the axial distance between the screws at the drive-end and thus to provide room for sufficiently large and long-life axial bearings.

In the case of dual- or multiple-screw extruders, it has been proposed, in U.S. Pat. No. 2,535,865, to provide each of the screws with one or more left-hand-threaded parts and one or more right-hand-threaded parts. With an arrangement of this kind it is even possible to design the left- and right-hand-threaded parts in such a manner that axial forces acting in opposite directions upon each screw cancel each other out or equalize each other, so that axial forces no longer act upon the screws; according to U.S. Pat. No. 2,535,865, this even makes it possible to eliminate axial bearings. An extruder of this kind is thus suitable for continuous operation.

U.S. Pat. No. 2,535,865 describes the principle of "left-and right-hand-threaded parts on one screw" only in connection with dual- or multiple-screw extruders, but this principle may obviously be applied to single-screw extruders also.

The disadvantage of the dual- or multiple-screw extruders known from U.S. Pat. No. 2,535,865, however, is that they are not designed for degasifying the volatile components of polymer solutions and melts in particular and especially they are not intended for degasification with no dead area nor any break-away edge.

In these days, the degasification of volatile components is extremely important in the prouction and processing of plastics:
in order to save raw-materials and power,
in connection with the quality, for example improving mechanical and optical properties, obtaining pore-free products, and improving processability, and
in connection with environmental protection and safety.

Most of the existing degasifying devices in single-, dual-and multiple-screw extruders have the disadvantage that break-away edges and/or dead areas exist or arise, where the material to be processed, e.g. a molten polymer, dwells and may thus be damaged by oxidation or heat; the reason for this is that, in such known degasifying devices, the material passes under under the degasifying device (e.g. a degasifying connection) or along the degasifying device.

In such known degasifying extruders, not used in continuous operation, the degasifying assembly (the degasifying opening) must be cleaned frequently. This, however, is not possible in the case of continuously operating installations such as extruders for spinning synthetic fibres.

Also known, is a conventional extruder, that is one in which the material to be processed is moved away from the drive in one direction only, the axial direction having a so-called reverse-degasifying arrangement at the beginning of the screw. The advantage of this reverse-degasifying arrangement, by means of which vapour or gas is carried away downatream in a direction opposite to that in which the product is conveyed, is that the material to be processed does not move along or under it; on the other hand, it has the disadvantage, especially in the case of dual- or multiple-screw extruders, that its location at the beginning of the screw makes it very difficult, or costly, to prevent the entry of gas or vapour, especially oxygen, from outside the extruder.

It is therefore the object of the invention to provide an extrusion process of the type mentioned hereinabove, by means of which, even during continuous operation, it is possible to degasify the volatile components of the material, or materials, to be processed in such a manner that the material, or materials, is, or are, not damaged, e.g. by heat or oxidation.

It is also the object of the invention to provide a suitable single-, dual- or multiple-screw extruder, of the kind mentioned hereinabove, for fully continuous operation, which is provided with one or more degasifying arrangements which can easily be sealed from the outside to prevent entry of vapour or gas, more particularly oxygen, and which make degasification possible with no dead areas and/or break-away edges.

The invention has the following advantages:

it may be used in continuous operation and for processing materials sensitive to heat and oxidation;

higher product-discharge pressures may be used without shortening the life of the (axial) bearing; there is no need to use separate pressure-increasing pumps;

the degasification-zones are free from dead areas and break-away edges and this has a positive effect upon the quality of the product;

a single-, dual- or multiple-screw extruder according to the invention need not be shut down for cleaning, especially the degasifying arrangement, even after very long periods of trouble-free operation;

a single-, dual- or multiple-screw extruder according to the invention can withstand a series of shut-downs, caused by problems, with no need for cleaning, especially of the degasifying arrangement; after such shut-downs, the extruder may easily be started-up again, with no danger of affecting the quality of the material to be processed;

various materials, such as various polymers, may be processed with a single-, dual- or multiple-screw extruder according to the invention;

because of the reduction in, or even the elimination of, axial forces, a single-, dual- or multiple-screw extruder according to the invention needs only a simple, therefore inexpensive, axial bearing, and thus an inexpensive transmission; this also has a long life;

with a single-, dual- or multiple-screw extruder according to the invention, it is possible to subject the screw, or screws, to tensile instead of compressive forces; the screw, or screws, are thus no longer stressed in collapse-buckling; this is particularly advantageous in the case of a very long extruder;

If the extrusion process according to the invention is carried out with the aid of a dual- or multiple-screw extruder, and if the extruder according to the invention is a dual- or multiple-screw extruder:

the screw system may rotate in the same direction or in opposite directions; and as regards the arrangement of the screw, they may not mesh (not engage with each other), they may engage (engage partly with each other), or they may mesh closely (engage intimately with each other).

The extrusion process according to the invention, and the single-, dual- or multiple-screw extruder may be used, for example:

to plasticize and homogenize synthetic molding compounds, to extrude semi-finished synthetic materials or polymer fibres and for processing- and reaction-extrusion, e.g. for processing solution-polymers.

The following, for example, may be processed with the invention: polyvinylchloride, polyesters (such as polyethyleneterephthalate, polyamides (such as polyamide-66) and polystyrene. The invention is particularly suitable for processing a product such as polyamide-66, sensitive to heat and oxidation, more particularly for extrusion-spinning polyamide-66 fibres.

In the case of the extrusion process according to the invention, reverse-degasification takes place:

at the end of the screw, or screws, if the material to be processed is carried away from this end along the screw, or screws, and/or at the location, or locations, between the sections of the thread of the screw, or screws, so that the material to be processed is carried away over these sections, in opposite directions, along the screw, or worms and the single-, dual- or multiple-screw extruder according to the invention is provided with a reverse-degasifying arrangement at the end of the screw, or worms, if the material to be processed is carried away from this end along the screw, or screws, and/or at the location, or locations, between the sections of the threads of the screw, or screws, so that the material to be processed is carried away over these sectionsin opposite directions along the screw, or screws.

This means that the material to be processed—because of the left-or right-handedness of a part of the threads of the screw, or screws—flows away from the degasifying arrangement in the longitudinal direction of the screw, or screws, so that there is no direct contact between the degasifying arrangement and the material to be processed; the degasifying arrangement is therefore located in front of the material to be processed.

As a result of this, no dead areas existor arise and the material to be processed is therefore not damaged, e.g. by heat and/or oxidation.

The invention is explained hereinbelow in greater detail in conjunction with the drawings attached hereto, wherein:

FIG. 8 is a diagrammatical cross-section of a single-screw extruder according to the invention with:

a reverse-degasifying arrangement at the end of the screw, a reverse-degasifying arrangement at the location between the sections of the thread of the screw so that the material to be processed is carried away over these sections in opposite directions along the screw and (several) bypass-lines for transferring the material to be processed from the end of the sections over which it is guided in direction A, to the beginning of the respective following sections over which it is guided in a direction B opposite to direction A, and a bypass-line for transferring the material to be processed from the end of the section over which it is guided in direction B, to the beginning of the following section over which it is guided in direction A.

Since the drive and transmission of the single-, dual- and multiple-screw extruder according to the invention are not absolutely necessary in order to illustrate the invention, they are not shown in FIGS. 1, 2, 3, 4, 7 and 8.

Figure 1:
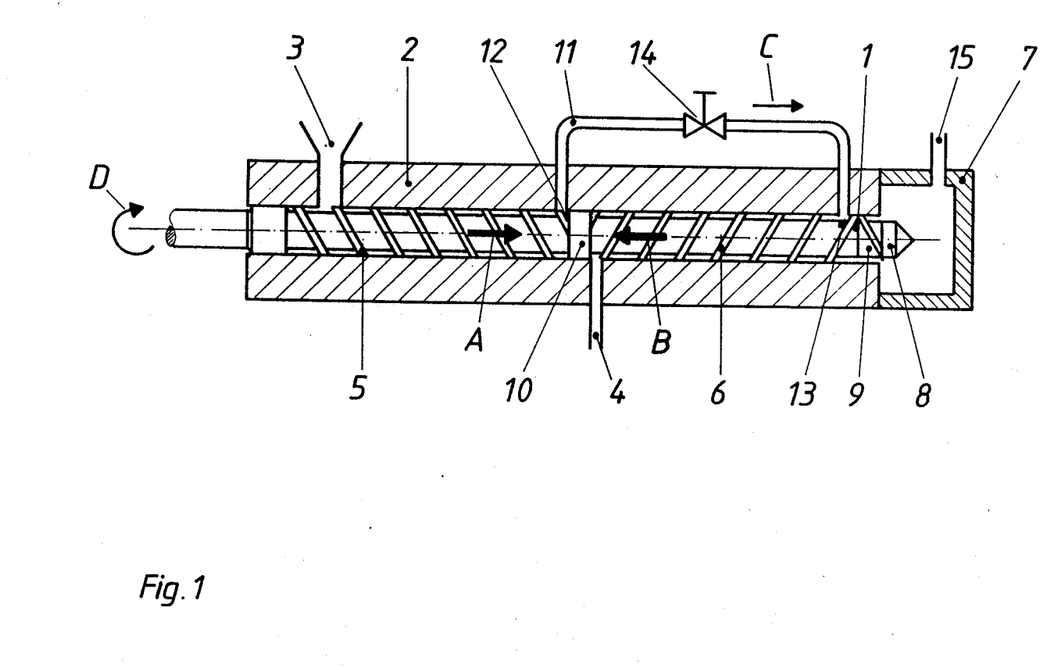
FIG. 1 is a diagrammatical cross-section of a single-screw extruder according to the invention, having a reverse-degasifying arrangement at the end of the screw and a bypass-line running substantially outside the housing.

Illustrated in FIG. 1 is a single-screw extruder according to the invention with:

a rotatable screw 1, a housing 2 within which the worm 1 can rotate. and a material-discharging arrangement 4.

Part 5 of the thread of screw 1 is right-handed while part 6 of the thread of screw 1 is left-handed.

The single-screw extruder shown is in the form of a degasifying extruder, in that a reverse-degasifying arrangement 7 is provided at end 8 of screw 1. End 8 of screw 1 is also provided with a short right-handed thread-part 9 as an overflow-outlet element; this element has no effect upon the flow of material from the end of the screw; instead it ensures that, when the extruder is started-up again after a shutdown, any material that overflows and is possibly damaged is not returned to the flow of material.

Arranged between right-handed thread-part 5 (screw-section 5) of screw 1 and left-handed thread-part 6 (screw-section 6) of screw 1 is a sealing element 10.

A bypass-line is also arranged to transfer the material to be processed from end 12 of the section over which this material is guided in the direction A (to end 8 of screw 1), to the beginning 13 of the section over which this material is guided in direction B (away from end 8 of screw 1). The bypass-line runs substantially outside housing 2 and it contains a throttling, regulating or metering element 14. Arrows A and B in FIG. 1 show the respective directions in which the material to be processed is guided by screw 1; arrow C in FIG. 1 shows the direction in which the material to be processed is guided through bypass-line 11. Arrow D shows the sense of rotation (direction of rotation) of screw 1. Finally, FIG. 1 shows that reverse-degasifying arrangement 7 is provided with a connection to which a vacuum may be applied in order to remove volatile components from the material to be processed.

Figure 2:
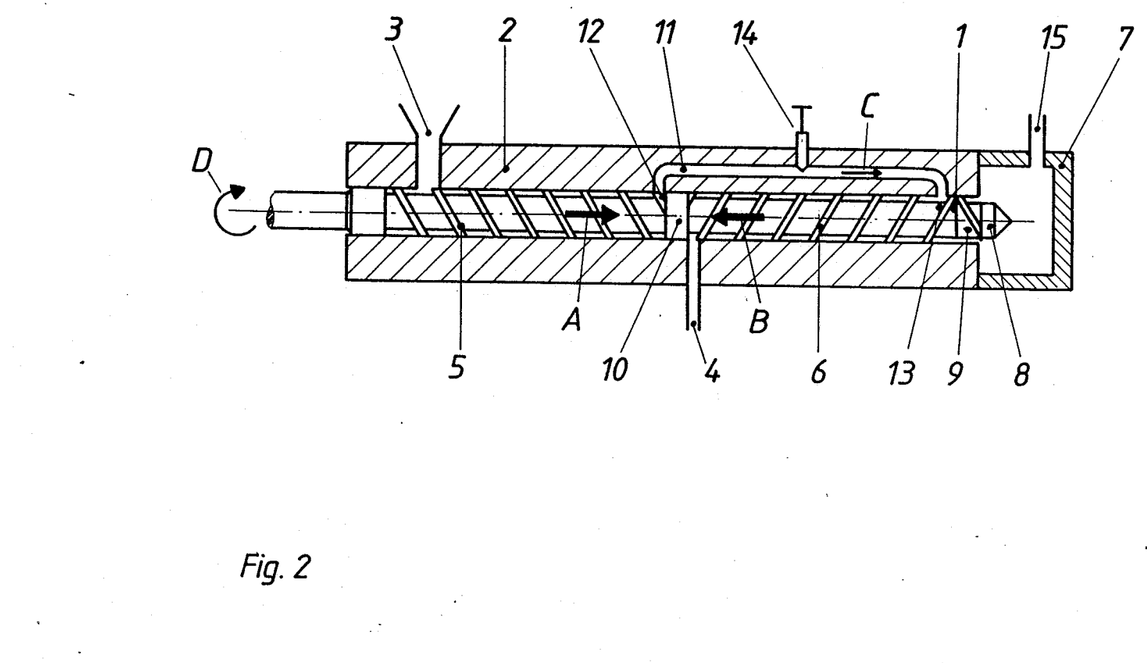
FIG. 2 is a diagrammatical cross-section of a single-screw extruder according to the invention, having a reverse-degasifying arrangement at the end of the screw and a bypass-line running through the housing.

FIG. 2 shows a single-screw extruder according to the invention as in FIG. 1, except that the bypass-line 11 runs through housing 2.

Figure 3:
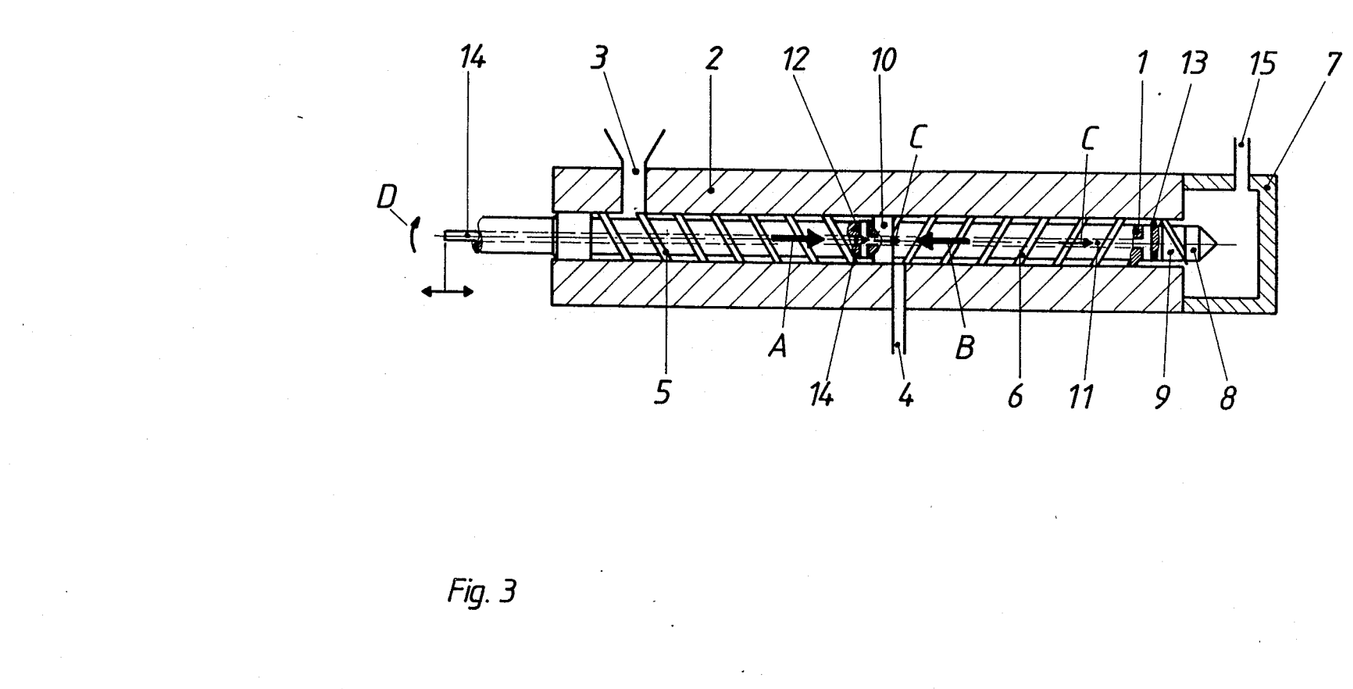
FIG. 3 is a diagrammatical cross-section of a single-screw extruder according to the invention, having a reverse-degasifying arrangement at the end of the screw and a bypass-line running through the screw.

FIG. 3 shows a single-screw extruder according to the invention as in FIG. 1, except that the bypass-line 11 runs through screw 1 and the throttling, regulating or metering element 14 is to be operated through screw 1.

Figure 4:
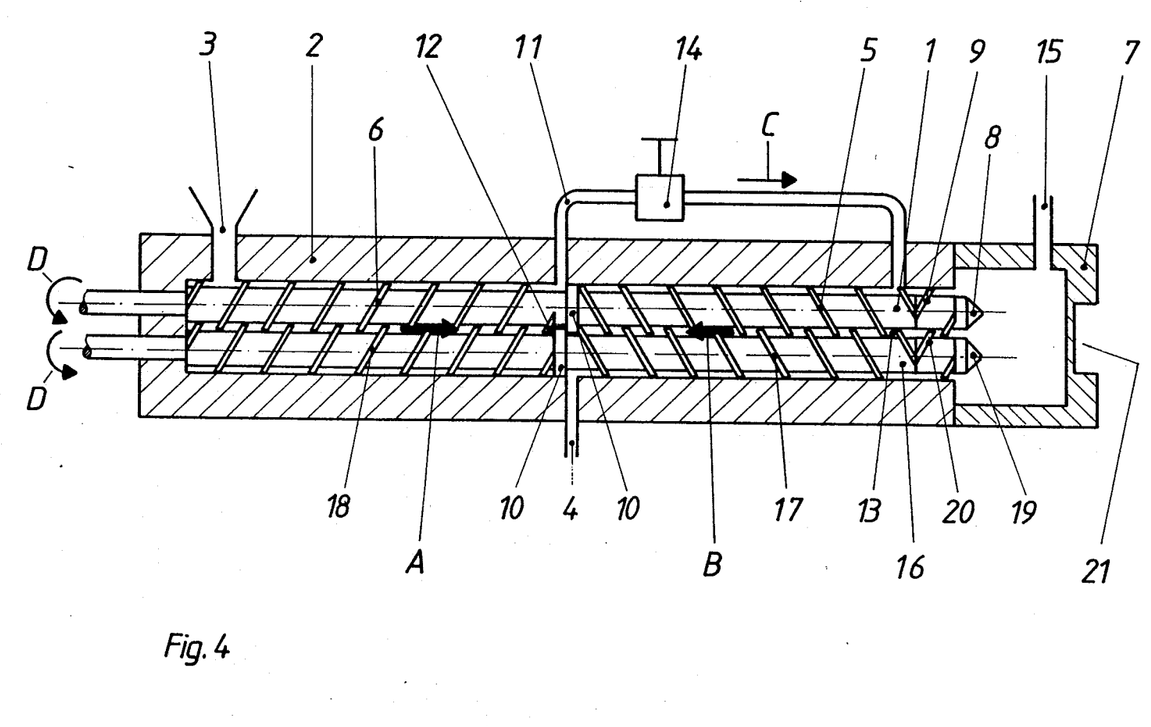
FIG. 4 is a diagrammatical cross-section of a dual-screw extruder according to the invention, having a reverse-degasifying arrangement at the end of the screws and a by-pass line running substantially outside the housing.

FIG. 4 shows a dual-screw extruder according to the invention with:

two rotatable screws 1 and 16, a housing 2 within which screws 1 and 2 can rotate, a material-charging arrangement 3.

Figure 5:
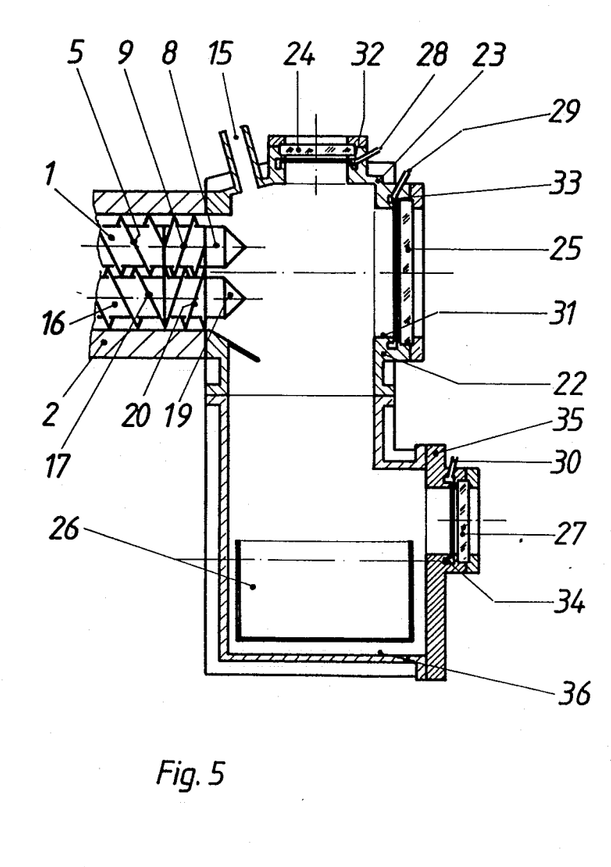
FIG. 5 is a diagrammatical cross-section, according to the invention, showing a (reverse-) degasification-chamber, located at the end of the screws, which is provided in its wall with, among other things, a detachable window arranged towards the end of the screws, for visual inspection of the end of the screws and of the material to be processed, with a collecting container for any of the material to be processed that overflows, and with a series of inlets for introducing a protective or inert gas into the degasification-chamber.

Part 5 of the thread of screw 1, and part 17 of the thread of screw 16 are both right-handed (see also FIG. 5). Part 6 of the thread of screw 1, and part 18 of the thread of screw 16, are both left-handed.

The dual-screw extruder shown is in the form of a degasifying extruder, in that a reverse-degasifying arrangement 7 is provided at end 8 of screw 1 and at end 19 of screw 16.

End 9 of screw 1 is also provided with a short left-handed thread-part 9, while end 19 of worm 16 is provided with a short left-handed thread-part 20 (see also FIG. 5): thread-parts 9 and 20 together form an overflow-outlet element (in this connection see the corresponding explanation of FIG. 1).

A sealing element 10 is arranged between left-handed thread-part (screw-section 6) and right-handed thread-part 5 (screw-section 5) of screw 1, and between left-handed thread-part 18 (screw-section 18) of screw 16 and right-handed thread-part 17 (screw-section 17) of screw 16.

Also arranged is a bypass-line 11 for transferring the material to be processed from end 12 of the section over which this material is guided in direction A (to ends 8 and 19 of screws 1 and 16), to the beginning 13 of the section over which this material is guided in direction B (away from ends 8 and 19 of worms 1 and 16).

Bypass line 11 runs substantially outside housing 2 and it contains a throttling, metering or regulating element 14.

Arrows A and B in FIG. 4 indicate the directions in which the material to be processed is guided by screws 1 and 16; arrow C in FIG. 4 shows the direction is which the material to be processed is guided through bypass-line 11. Arrows D indicate the sense of rotation (direction of rotation) of screws 1 and 16.

Finally, FIG. 4 shows that reverse-degasifying arrangement 7:

is provided with a connection to which a vacuum is applied to carry volatile components away from the material to be processed and is provided with a window 21 for visual inspection of ends 8 and 19 of screws 1 and 16 and of the material to be processed.

FIG. 5 shows, according to the invention, a reverse-degasification chamber 22 provided at ends 8 and 19 of screws 1 and 16 of a dual-screw extruder according to the invention.

This reverse-degasification chamber 22 is provided:

in its wall 23 with a window 24 and a window 25 for visual inspection of screws 1 and 16 and of the material to be processed, with a collecting container 26 for any of the material to be processed that overflows (e.g. during a shutdown), in its wall 23, with a window 27 for visual inspection of collecting container 26, with a connection 15 to which a vacuum is applied to carry volatile components away from the material to be processed and with inlets 28,29,30 for introducing a protective or inert gas, such as nitrogen, into reverse-degasification chamber 22.

Window 25 in wall 23 of reverse-degasification chamber 22 is arranged to face ends 8 and 19 of screws 1 and 16 and is detachable; window 25 is circular and is of a size such that screws 1 and 16 may be removed from the extruder according to the invention through window-opening 31, or may be so installed in the said extruder.

Inlets 28,29 and 30, for introducing a protective or inert gas are connected respectively to annular slotted nozzles 32,33 and 34, so that the said protective or inert gas is injected in the vicinity of windows 24,25 and 27, with the result that the windows do not become fogged and may still be used to inspect ends 8 and 19 of screws 1 and 16, the material to be processed, and the level in collecting container 26, after very long operating periods.

Wall 23 of reverse-degasification chamber 22 is preferably designed in such a manner as to be heatable, in order to prevent the deposit, example of monomers; this may be accomplished, for example by using a steam-heated double-wall.

Part 35 of wall 23 of reverse-degasification chamber 22, which contains window 27, is in the form of a detachable circular cover 35; if this cover is removed, collecting container 26 may easily be removed through cover-opening 26 for emptying, the opening being sized accordingly.

Figure 6:
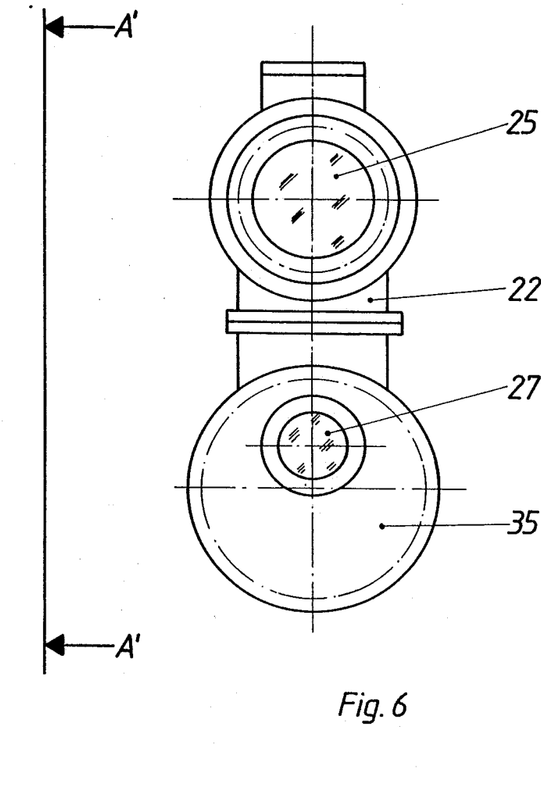
FIG. 6 is a view of the degasification-chamber along the line A'—A' in FIG. 5.

FIG. 6 is a view of reverse-degasification chamber 11 along the line A'—A' in FIG. 5. As shown, windows 25 and 27 are circular; detachable cover 35 is also circular.

Figure 7:
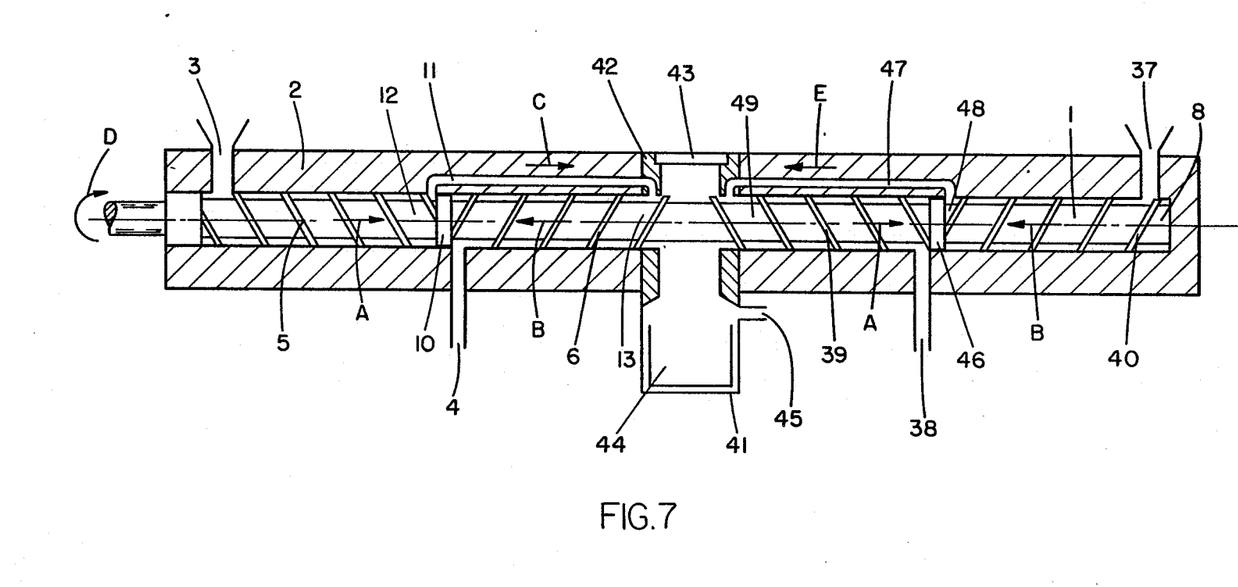
FIG. 7 is a diagrammatical cross-section of a single-screw extruder according to the invention with a reverse-degasifying arrangement at the location between the sections of the thread of the screw, so that the material to be processed is carried away over these sections in opposite directions along the screw; this reverse-degasifying arrangement is provided with a collecting container for any of the material to be processed that overflows, and a window for visual inspection of the screw and of the material to be processed.

FIG. 7 shows a single-screw extruder according to the invention with:
a rotatable screw 1,
a housing 2 in which screw 1 can rotate,
a material-charging arrangement 3 (for charging a material X),
a material-charging arrangement 37 (for charging a material X and material Y,
a material-discharging arrangement 4 and
a material-discharging arrangement 38.

Parts 5 and 39 of the thread of screw 1 are right-handed, while parts 6 and 40 of the thread of screw 1 are left-handed.

The single-screw extruder shown is in the form of a degasifying extruder, in that a reverse-degasifying arrangement 41 is provided at the location between the sections of the thread of screw 1 where the material to be processed is carried away over these sections in opposite directions A and B along screw 1.

Reverse-degasifying arrangement 41 is provided:
in its wall 42 with a window 43 for visual inspection of screw 1 and of the material to be processed,
with a collecting container 44 for any of the material to be processed that overflows, and
with a connection 45 to which a vacuum is applied in order to carry volatile components away from the material to be processed.

Arranged between right-handed thread-part 5 (screw-section 5) and left-handed thread-part 6 (screw-section 6) of screw 1 is a sealing element 10; arranged between right-handed thread-part 39 (screw-section 39) of screw 1 and left-handed thread-part 40 (screw-section) 40 of screw 1 is a sealing element 46.

Also arranged is a bypass-line 11 for transferring the material to be processed from end 12 of the section over which this material is guided in direction A (to end 8 of screw 1), to the beginning 13 of the section over which this material is guided in direction B (away from end 8 of screw 1). A bypass-line 47 is also arranged for transferring the material to be processed from end 48 of the section over which this material is guided in direction B (away from end 8 of screw 1), to the beginning 49 of the section over which this material is guided in direction A (to end 8 of screw 1). Bypass-lines 11 and 47 run through housing 2.

Arrows A and B in FIG. 7 indicate the respective directions in which the material to be processed is guided (conveyed) by screw 1; arrows C and E in FIG. 7 indicate the respective directions in which the material to be processed is guided through bypass-lines 11 and 47. Arrow D indicate the sense of rotation (direction of rotation) of screw 1.

Figure 8:
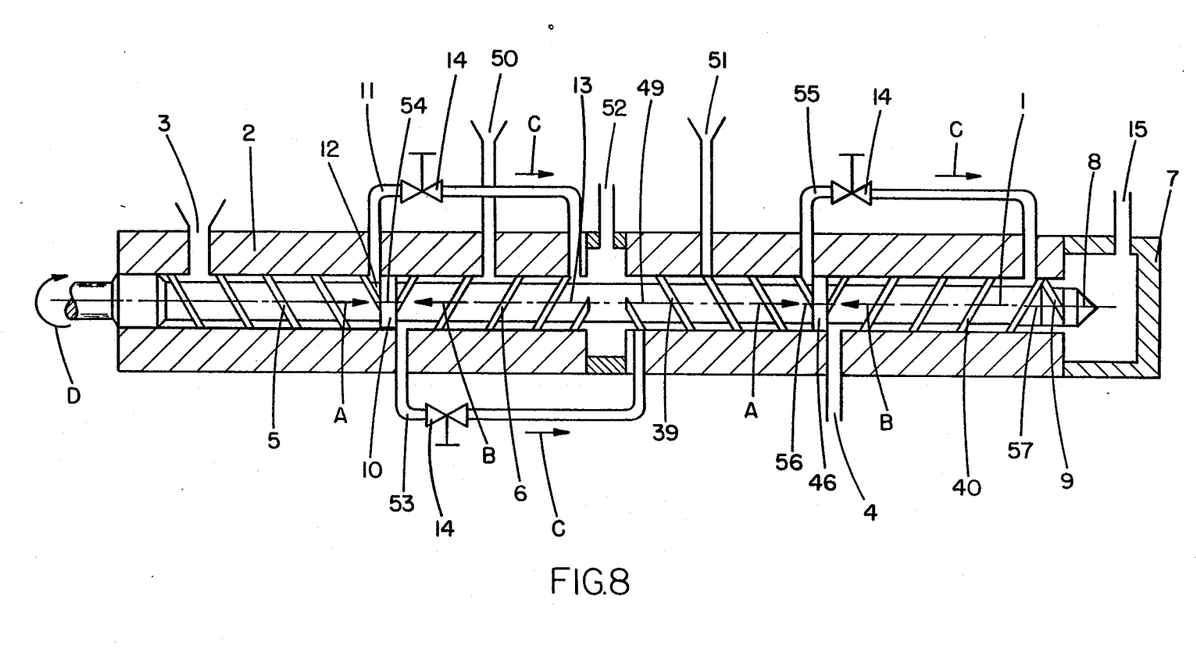

Finally, FIG. 8 illustrates a single-screw extruder according to the invention with:
a rotating screw 1,
a housing 2 within which screw 1 can rotate,
a material-charging arrangement 3 (for charging a material X),
a material-charging arrangement 50 (for charging degasifying aids, polymer additives or fillers, for example),
a material-charging arrangement 51 (for charging degasifying aids, polymer additives or fillers) and
a material-discharging arrangement 4.

Parts 5 and 39 of the thread of screw 1 are right-handed, while parts 6 and 40 of the thread of screw 1 are left-handed.

The single-screw extruder illustrated is in the form of a degasifying extruder (with multiple degasification), in that:
a reverse-degasifying arrangement 7 is provided at end 8 of screw 1,
a reverse-degasifying arrangement 52 (with connections) is provided at the location between the sections of the thread of screw 1 so that the material to be processed is carried away over these sections in opposite directions A and along screw 1.

End 8 of screw 1 is also provided with a short right-handed thread-part 9 as an overflow-outlet element (see corresponding explanation of FIG. 1).

Arranged between right-handed thread-part 5 (screw-section 5) of screw 1 and left-handed thread-part 6 (screw-section 6) of screw 1 is a sealing element 10; arranged between right-handed thread-part 39 (screw-section 39) of screw 1 and left-handed thread-part 40 (screw-section 40) of screw 1 is a sealing element 46.

Also arranged is a bypass-line 11 for transferring the material to be processed from end 12 of the section over which this material is guided in direction A (to end 8 of screw 1), to the beginning 13 of the section over which this material is guided in direction B (away from end 8 of screw 1). In addition to this, a bypass-line 53 is arranged for transferring the material to be processed from end 54 of the section over which this material is guided in direction B (away from end 8 of screw 1), to the beginning 49 of the section over which this material is guided in direction A (to end 8 of screw 1). Finally, a bypass-line 55 is arranged for transferring the material to be processed from end 56 of the section over which this material is guided in direction A (to end 8 of screw 1), to the beginning 57 of the section over which this material is guided in direction B (away from end 8 of screw 1), Bypass-lines 11, 53 and 55 run substantially outside housing 2; a throttling, metering or regulating element 14 is arranged in the said bypass-lines.

Arrows A and B in FIG. 8 indicate the respective directions in which the material to be processed is guided by screw 1; arrows C is FIG. 8 indicate the direction in which the material to be processed is guided through bypass-lines 11, 53 and 55. Arrow D indicates the sense of rotation (direction of rotation) of screw 1.

FIG. 8 also shows that reverse-degasifying arrangement 7 is provided with a connection 15 to which a vacuum is applied for carrying volatile components away from the material to be processed. A vacuum for carrying volatile components away from the material to be processed is also applied to reverse-degasifying arrangement 52 in FIG. 8.

The invention is furthermore explained in conjunction with the following example.

EXAMPLE

The extruder used for the example was a a dual-screw extruder according to the invention as illustrated diagrammatically (in principle) in FIG. 4, except that reverse-degasifying arrangement 7 at ends 8 and 19 of screws 1 and 16 was reverse-degasification chamber 22, shown in FIGS. 5 and 6, with, among other things, a collecting container 26 (for any of the material to be processed that overflows).

This dual-screw extruder was used for the extrusion-spinning of polyamide-66 filament-yarns (Nylon-66 filament-yarns).

The amount of polyamide-66 to be processed obtained from the extruder was 80 kg/h. Screws 1 and 16 of the extruder used rotated in the same direction (in the same sense) and meshed closely continuously (they engaged intimately with each other).

The first process-stage of the extruder used, namely the area between material-charging arrangement 3 and sealing elements 10, served to take the material in, to melt it and to build-up pressure; the design of screws 1 and 16 in this first stage of the process corresponded to that of a conventional layout for the above-mentioned purposes and comprised—as seen in the direction from the beginning to the end of the screws—an inlet-element, kneading blocks and pressure-build-up elements.

In the first stage of the process, the threads of screws 1 and 16 were left-handed—as seen in the direction from the beginning to the end of the screws.

The second process-stage of the dual-screw extruder used, namely the area between ends 8 and 19 of screws 1 and 16 and sealing elements 10, served to discharge the overflow (excess material), for degasifying, and for pressure-build-up; in this second stage of the process, screws 1 and 16 comprised—as seen in the direction from ends 8 and 19 to the beginning of screws 1 and 16—conventional, short, left-handed screw-elements 9 and 20 for discharging the overflow (excess material), conventional - right-handed - screw-elements in the degasifying area (degasifying elements) for conveying the molten polyamide-66, and conventional - right-handed - pressure-build-up elements.

A non-pre-dried (extruded) granular polyamide-66 (Nylon-66) having a moisture-content of 0.45% (=storage moisture), an average grain-weight of 0.07 g, and a titanium-dioxide content of 0.3% by mass (% by weight) was fed, through a - volumetric - metering device, to material-charging arrangement 3 of the dual-screw extruder.

In the first stage of the process, the above-mentioned granular material was melted in the vicinity of the kneading blocks (kneading elements) and was compressed, in the area of the pressure-build-up elements, to a pressure of 55 bars ($55 \cdot 10^5$ pascals). From the end of the first process stage, and thus from the end of the pressure-build-up stage—in this first process-stage—the molten polyamide-66 was transferred, through bypass-line 11, to the beginning of the second stage of the process. Between a throttling element 14 (a melt-valve)—arranged in bypass-line 11—and the entry of the molten polyamide-66 into the second stage of the process, the pressure of the melt was throttled from 55 bars ($55 \cdot 10^5$ pascals) to 350 mbars (350 hectopascals).

In the second stage of the process, a vacuum at an absolute pressure of 350 mbars (350 hectopascals) was applied through connection 15 in reverse-degasification chamber 22 (see FIG. 5); as a result of this, the molten polyamide-66 was freed from excess water and from monomers, in the area of the degasifying elements—where the melt is not compressed. Thereafter, the molten polyamide-66 was compressed, in the area of the pressure-build-up elements, to a discharge-pressure of 60 bars ($60 \cdot 10^5$ pascals). The molten polyamide, thus compressed, was then fed to material-discharge arrangement 4 of a high-speed filament spinning device by means of which it was spun to polyamide-66 filament yarns 22 dtex f 5. The filaments and filament-yarns were of unexceptionable quality, more particularly the filaments showed no signs of having been damaged by heat and there was also less filament-breakage—as compared with known extrusion-spinning processes;

the filament-yarns had outstanding physical properties.

The following information also applies to this example:

The temperature of the molten polyamide-66 at the outlet (end) of the first stage of the process amounted to 292° C.

The temperature of the molten polyamide-66 at the outlet (end) of the second stage of the process amounted to 298° C.

In the first stage of the process, the temperature of the housing-heating (cylinder-heating) in the melting area was 290° C. and, in the pressure-build-up area, was 275° C.

The - diphenyl-diphenyloxide heated - bypass-line 11 has a temperature of 298° C.

In the second stage of the process, the temperature was reduced, with the aid of a cooling blower, to a value of between 225° and 240° C.—there was no need to apply heat in the second stage of the process since sufficient heat was obtained by compressing the molten polyamide-66.

The pressure differential between the first and second stages of the process at the sealing elements was adjusted, by means of melt-valve 14 (throttling element 14) in bypass-line 11 in such a manner that the pressure at the end of the second stage of the process was higher than at the end of the first stage of the process; this prevented the non-degasified molten polyamide-66, from the first stage of the process, from passing through sealing elements 10 and reaching the (high-speed) filament-spinning device through material-discharging arrangement 4 (since design-conditions do not permit complete sealing, by sealing elements 10, between the first stage of the process and the second stage of the process when a pressure-differential exists).

However, the above-mentioned pressure-differential is best kept as small as possible, in order to keep as small as possible the leakage flow past sealing elements 10 and thus the flow of polyamide-66 circulating in the dual screw extruder; this prevents thermal decomposition of the polyamide-66 as a result of an excessive period of residence in the extruder.

Like bypass-line 11, reverse-degasification chamber 22 was heated to a temperature of 298° C.

Nitrogen was injected, through inlets 28, 29 and 30 and through annular slotted nozzles 32, 33 and 34 in reverse-degasification chamber 22, in the vicinity of windows 24, 25 and 27.

Material-charging arrangement 3 was adjusted to a temperature of 90° C.

Finally, the rotational speed of screws 1 and 16 amounted to 160 r.p.m.

We claim:

1. The process of extruding a polymer which consists of guiding said polymer along a rotating single screw which in the first section is left handed and in the second section is right handed, or in the first section is right handed and in the second section is left handed or
   a rotating dual screw, one of the screws being in the first section left handed and in the second section right handed, the other screw being in the first section left handed and in the second section right handed or
   one of the screws being in the first section right handed and in the second section left handed, the other screw being in the first section right handed and in the second section left handed or
   one of the screws being in the first section left handed and in the second section right handed, the other screw being in the first section right handed and in the second section left handed or
   one of the screws being in the first section right handed and in the second section left handed, the other screw being in the first section left handed and in the second section right handed, each of said sections having an inlet and an outlet; the end of said screw or screws being provided with at least a short portion (9, 20), which is left handed or right handed when the last section of the screw or screws is right handed or left handed respectively, whereby the polymer is introduced into the first section, travels in the first section in the direction A and in the second section in the direction B opposite to said direction A, wherein blocking, sealing or throttling is applied between the section in which the polymer is guided in the direction A and the section in which the polymer is guided in the direction B, transferring the polymer from the outlet of said first section to the inlet of said second section by means of a by-pass line, reverse degasifying in a degasification zone at the end of said screw or screws whereby there is not direct contact between the reverse degasifying zone and the polymer, whereby the polymer flows away from said degasifying zone, removing the polymer from said second section at a location between said first and second sections, said short portion being located adjacent said degasification zone, discharging the polymer which has overflown in said short portion (9,20) adjacent said degasifying zone during a shutdown whereby when the process is restarted after a shutdown, said polymer which has overflown is prevented from returning to the polymer being extruded.

2. The process of extruding a polymer which consists of guiding said polymer along a rotating single screw, which is in a first section right handed, in a second section left handed, in a third section right handed and in a fourth section left handed or
   in a first section left handed, in a second section right handed, in a third section left handed and in a fourth section right handed, each of said sections having an inlet and an outlet, a short portion which is left handed or right handed respectively when the second section is right handed or left handed being provided between said second and third section, whereby said polymer travels in the direction A in said first and third sections and in the direction B opposite to said direction A in the second and fourth sections, and wherein blocking, sealing or throttling is applied between the sections in which the polymer is guided in the direction A and the sections in which the polymer is guided in the direction B, introducing the polymer in the first section, transferring the polymer from the outlet of said first section to the inlet of said second section by means of a first by-pass line, transferring the polymer from the outlet of said fourth section to the inlet of said third section by means of a second by-pass line, reverse degasifying in a degasification zone between said second and third sections, whereby there is not direct contact between the reverse degasifying zone and the polymer, and whereby the polymer flows away from said degasifying zone, and removing the polymer from said second section at the location between said first and second sections, and from said third section at a location between said third and fourth sections, said short portion being located adjacent said degasification zone discharging the polymer which has overflown in said short portion adjacent said degasifying zone during a shutdown whereby when the process is restarted after a shutdown, said polymer which has overflown is prevented from returning to the polymer being extruded.

3. The process of extruding a polymer which consists of guiding said polymer along a rotating screw, which is
   in a first section right handed, in a second section left handed, in a third section right handed and in a fourth section left handed or
   in a first section left handed, in a second section right handed, in a thrid section left handed and in a fourth section right handed, each of said sections having an inlet and an outlet; the end of said screw being provided with a short portion (9) which is left handed or right handed respectively when said fourth section is right handed or left handed, whereby said polymer travels in the direction A in said first and third sections and in the direction B opposite to said direction A in said second and fourth sections, introducing the polymer into said first section, transferring the polymer from the outlet of the first section to the inlet of the second section through a first by-pass line, transferring the polymer from the outlet of the second section to the inlet of the third section, through a second by-pass line, transferring the polymer from the outlet of the third section to the inlet of the fourth section through a third by-pass line, wherein blocking, sealing or throttling is applied between the sections (10,46) in which the polymer is guided in the direction A and the sections in which the polymer is guided in the direction B, reverse degasifying at two degasification zones, one zone being at the end of said screw and the other zone being between said second and third section, whereby there is no direct contact between the reverse degasifying zones and the polymer, and whereby the polymer flows away from said degasifying zones, and removing the polymer from said fourth section at the location between said third and fourth sections, said short portion being located adjacent degasification zone, located at the end of said screw discharging the polymer which has overflown in said short portion (9) adjacent said degasifying zone at the end of said screw during a shutdown whereby when the process is restarted after a shutdown said polymer which has overflown, is prevented from returning to the polymer being extruded.

4. The process according to claim 1, 2 or 3 wherein the reverse degasifying is carried out in the presence of an inert gas.

5. The process according to claim 1, 2 or 3 wherein the reverse degasifying is carried out while applying a vacuum.

6. The process according to claim 1 wherein said polymer is polyamide-66, said polyamide-66 is guided along a rotating dual screw, one of the screws in the first section is left handed and in the second section right handed, the other screw is in the first section left handed and in the second section right handed, in the first section said polyamide-66 is melted and pressure built up to 55 bars and the temperature is 292° C., said molten polyamide-66 is transferred through said by-pass line to the inlet of said second section, the pressure is throttled to 350 mbars the temperature is 225°–240° C., water and monomers are removed in the degasification zone, and then the molten polyamide-66 is compressed to 60 bars, prior to removal from said screw.

7. An extruder for extruding a polymer, the extruder comprising
a rotatable single screw which in the first section is left handed and in the second section is right handed, or in the first section is right handed and in the second section is left handed or
a rotatable dual screw, one of the screws being in the first section left handed and in the second section right handed, the other screw being in the first section left handed and in the second section right handed or
one of the screws being in the first section right handed and in the second section left handed, the other screw being in the first section right handed and in the second section left handed or
one of the screws being in the first section left handed and in the second section right handed, the other screw being in the first section right handed and in the second section left handed or
one of the screws being in the first section right handed and in the second section left handed, the other screw being in the first section left handed and in the second section right handed,
each of said sections having a polymer-charging means and a polymer-discharging means, the extruder further comprising a housing within which said screw rotates or said screws rotate, a drive, a transmission, a by-pass line which is arranged for transferring the polymer from the polymer-discharging means of said first section to the polymer-charging means of said second section, a throttling, regulating or metering element located between the first section and the second section or two throttling, regulating or metering elements located between the first sections and the second sections when the screw is a rotatable dual screw and the screws are both in the first section left handed or right handed and in the second section both right handed or left handed respectively, reverse-degasifying means located at the end of said screw or screws whereby the polymer is carried away along said screw or screws, said reverse-degasifying means having no direct contact with the polymer, a short threaded portion (9,20) adjacent said reverse degasifying means which is left handed or right handed when the last section of the screw or screws is right handed or left handed respectively, whereby the polymer being processed is guided away from said reverse degasifying means and the polymer-discharging means of said second section is provided at a location between said first and second sections.

8. An extruder for extruding a polymer, the extruder comprising a rotatable single screw, which is
in a first section right handed, in a second section left handed, in a third section right handed and in a fourth section left handed or
in a first section left handed, in a second section right handed, in a third section left handed and in a fourth section right handed,
each of said sections having a polymer-charging means and a polymer-discharging means, the extruder further comprising a housing within which said screw rotates, a drive, a transmission, a first by-pass line located at the end of said first section for transferring the polymer from the polymer-discharging means of said first section to the polymer-charging means of said second section, a second by-pass line located at the end of said fourth section for transferring the polymer from the polymer-discharging means of said fourth section to the polymer-charging means of said third section, two throttling, sealing or regulating elements (10,46) located between each of the left handed sections and the right handed sections, reverse-degasifying means between said second and third sections whereby the polymer is carried away along said screw, said reverse-degasifying means having no direct contact with the polymer, a collection container (44) located adjacent said degasifying means for collecting material which has overflown during a shut-down, the polymer-discharging means of said second section is located at a location between said first and second sections and the polymer-discharging means of said third section is located at a location between said third and fourth sections.

9. An extruder for extruding a polymer, the extruder comprising a rotatable screw which is
in a first section right handed, in a second section left handed, in a third section right handed and in a fourth section left handed or
in a first section left handed, in a second section right handed, in a third section left handed and in a fourth section right handed
each of said sections having a polymr-charging means and a polymer-discharging means, the extruder further comprising a housing within which said screw rotates, a drive, a transmission, a first by-pass line located at the end of said first section for transferring the polymer from the polymer-discharging means of said first section to the polymer-charging means of said second sections, a second by-pass line located at the end of said second section for transferring the polymer from the polymer-discharging means of said second section to the polymer-charging means of said third section, a third by-pass line located at the end of said third section for transferring the polymer from the polymer-discharging means of said third section to the polymer-charging means of said fourth section, two blocking, throttling or sealing means (10,46) located between each of the left handed sections and right handed sections and a throttling, sealing or regulating element (14) in each of said by-pass lines, two reverse-degasifying means, one being located at the end of said screw and the other being located between said second and third sections, a short threaded portion (9) at the end of said fourth portion and adjacent one of said reverse degasifying means, said short threaded portion being left handed or right handed respectively when said fourth section is right handed or left handed, whereby the polymer is carried away from said reverse-degasifying means along said screw, said reverse-degasifying means having no direct contact with the polymer, the polymer-discharging means of said fourth section is located at a location between said third and fourth sections.

10. The extruder according to claim 7, 8 or 9 wherein the reverse-degasifying means is or are provided with an inlet or several inlets for the introduction of a protective or inert gas therein.

11. The extruder according to claim 7, 8 or 9 wherein the reverse-degasifying means is or are provided with an arrangement or several arrangements for applying a vacuum therein.

12. The extruder according to claim 7, 8 or 9 wherein a throttling, regulating or metering element is or several throttling, regulating or metering elements are arranged in the by-pass line or in the by-pass lines.

13. The extruder according to claim 7, 8 or 9 wherein the reverse-degasifying means is or are provided with a container or several containers to collect overflowing polymer.

14. The extruder according to claim 7, 8 or 9 wherein the reverse-degasifying means is or are provided with a window or several windows for visual inspection of the screw or screws and of the polymer.

15. The extruder according to claim 7, 8 or 9 wherein the degasifying means provided at the end of the screw or screws is a degasifying-chamber, having a wall provided with a window arranged facing the end of the screw or screws for visual inspection of the end of the screw or screws and of the polymer.

16. The extruder according to claim 7, 8 or 9 wherein the window of the degasifying-chamber is detachable or can be opened and is of a size and shape such that the screw or screws are adapted to be removed from, or installed in, the extruder through a window-opening of said window.

17. The extruder according to claim 7, 8 or 9 wherein the bypass-line runs or the bypass-lines run through the housing, or substantially externally of the housing, or through the screw or screws.

* * * * *